United States Patent [19]

Hurner

[11] 3,929,187

[45] Dec. 30, 1975

[54] VIBRATION RESISTANT HEAT EXCHANGER FOR INTERNAL COMBUSTION ENGINES

[76] Inventor: Edwin E. Hurner, 2605 S. Rivershore Drive, Moorhead, Minn. 56560

[22] Filed: Dec. 23, 1974

[21] Appl. No.: 536,034

[52] U.S. Cl. .................. 165/52; 165/195; 165/163; 123/122 E
[51] Int. Cl.$^2$ ........................................ F02M 31/02
[58] Field of Search........ 165/51, 157; 123/142.5 R, 123/122 E, 34 A, 79 H; 432/63

[56] References Cited
UNITED STATES PATENTS

| | | | |
|---|---|---|---|
| 889,775 | 6/1908 | Dupuis et al............................ | 122/33 |
| 1,391,709 | 9/1921 | Wood et al............................. | 165/52 |
| 2,657,020 | 10/1953 | Hofmeister ........................... | 165/163 |
| 2,974,656 | 3/1961 | Germain................................ | 165/52 |

*Primary Examiner*—Charles J. Myhre
*Assistant Examiner*—Theophil W. Streule, Jr.
*Attorney, Agent, or Firm*—Williamson, Bains & Moore

[57] ABSTRACT

A vibration resistant heat exchanger for preheating viscous fuels prior to burning in a Diesel engine or other internal combustion engine utilizes a fluid-tight coolant tank defined by a cylindrical sidewall with first and second endwalls, the coolant tank being connected to a source of heated coolant which continually flows through the tank. A fuel heating conduit is positioned within the coolant tank and connected between a source of fuel and the engine so that otherwise cold fuel flows through the heat exchanger and is warmed therein before being delivered to the engine for burning. The fuel heating conduit utilizes three generally parallel tubes spaced inwardly from the sidewall of the coolant tank and connected with a pair of U-shaped couplers. Each of the couplers is positioned adjacent an endwall and bears against the sidewall and the adjacent endwall to prevent movement and vibration of the conduit relative to the tank. Each of the endwalls is provided with a fuel port through which a tube of the heating conduit extends. Each endwall is also provided with a coolant port which confronts the coupler adjacent that endwall. Each coupler has a spacer extending from and bearing against the adjacent endwall to space the coupler from the endwall to permit free flow of coolant between the endwall and the coupler to encourage turbulence as coolant enters and leaves the tank, thereby improving heat transfer from coolant to heating conduit.

6 Claims, 5 Drawing Figures

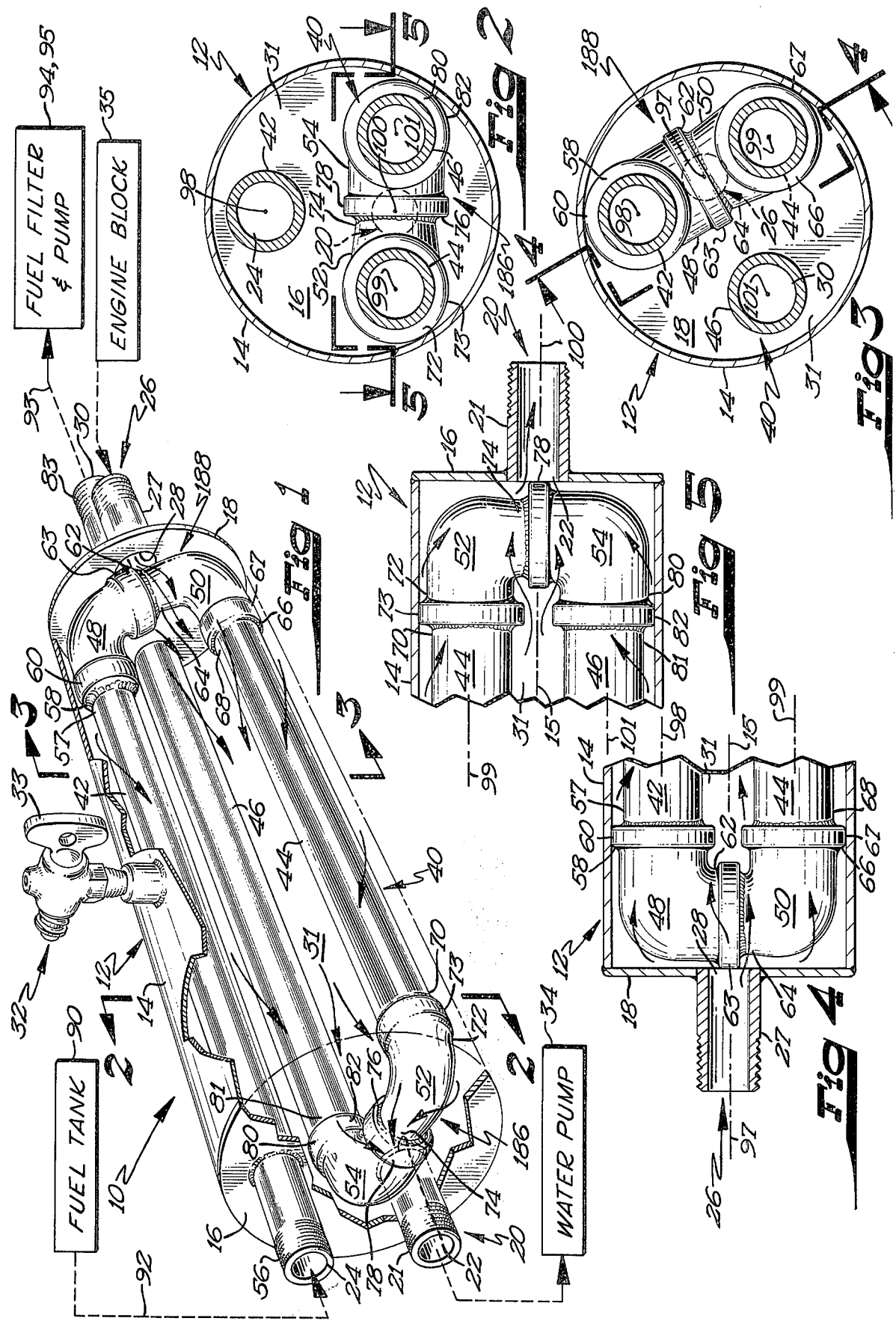

VIBRATION RESISTANT HEAT EXCHANGER FOR INTERNAL COMBUSTION ENGINES

BACKGROUND OF THE INVENTION

The invention relates to the field of heat exchangers for use with internal combustion engines such as those used in Diesel trucks, and provides an apparatus by which low temperature, often highly viscous fuels may be preheated prior to burning in the engine to thereby reduce the viscosity of the fuel, eliminate fuel filter clogging, and improve burning efficiency of the fuel in the engine.

Under cold weather conditions, relatively heavy fuel such as No. 2 oil burned by Diesel truck engines and the like becomes thick and sluggish. When the temperature reaches the area of −20° Fahrenheit or colder, the fuel may be too thick to pass normally through a fuel filter, and even on reaching the engine may be too cold to readily ignite, or alternatively if burnable, burns with substantially less than normal efficiency, resulting in poor mileage and higher operating costs for the vehicle. These problems may be solved by using a heat exchanger device so that the cold, viscous fuel may be heated to a temperature where the fuel flows more readily, does not clog the fuel filter, and burns with normal efficiency in the engine. Typically, such heat exchangers consist of a tank which is heated by exhaust gases or by engine coolant, a fuel line entering the tank and being coiled or arranged to provide multiple turns within the tank to increase the time during which fuel passing through the coils is exposed to the heated interior of the coolant tank.

A shortcoming of the known heat exchangers is that the internal coils or tubes carrying the fuel for heating within the tank are subject to extensive and prolonged vibration from the heavy-duty truck engines with which they are connected, and eventually such vibration causes fuel leakage from the coils and failure of the heat exchanger. If the fuel coil or tube within the tank breaks due to fatigue or rubbing of the coil against the tank skin, fuel leaks from the fuel line into the coolant and coolant mixes with the fuel. Injection of coolant into the combustion system of the engine can cause extensive engine damage, and injection of certain fuels into the cooling system of the vehicle can be damaging and under some circumstances dangerous.

It is an object of the present invention to provide a heat exchanger which is resistant to vibration and wherein the fuel-carrying tubes do not come in direct contact with the sidewalls of the tank and have no opportunity to vibrate or move relative to the tank, thereby eliminating the problem of fuel line breakage within the tank due to heavy vibration. Additionally, it is desirable to prolong exposure of the fuel line to heated coolant within the tank to thereby increase heat transfer between coolant and fuel line.

SUMMARY OF THE INVENTION

The invention utilizes a rigid, fluid-tight coolant tank defined by a cylindrical sidewall with ends tightly closed by first and second endwalls. Each endwall is provided with a coolant port and a fuel port, the coolant ports being in fluid flow communication with a source of flowing, heated coolant such as a motor vehicle cooling system.

A fuel heating conduit is positioned within the coolant tank and is connectable between the vehicle's fuel tank and its engine, preferably being upstream of any fuel filter. The fuel heating conduit includes first, second and third generally elongated, straight tubes and a pair of U-shaped couplers, one coupler being positioned adjacent each endwall. One coupler connects an end of the first tube with an end of the second tube, and the remaining U-shaped coupler connects the remaining end of the second tube with an end of the third tube, the remaining ends of the first and third tubes being in communication with the fuel ports of the endwalls and passing therethrough in sealed relationship to the endwalls. Each of the U-shaped couplers bears against the adjacent endwall and also against the cylindrical sidewall of the coolant tank and cooperates with one another and with the fuel ports to rigidly wedge the fuel heating conduit within the tank and prevent movement of the first, second and third tubes relative to the tank, thereby eliminating vibration and loosening of the fuel carrying tubes. Each U-shaped coupler has a spacer extending toward and bearing against the adjacent endwall to space the coupler from the endwall to permit free flow of hot coolant between the coupler and the endwall. Each of the U-shaped couplers is also provided with a pair of annular lips, each of the lips being concentric with one of the tubes extending from the coupler and extending outwardly from the coupler to bear against the sidewall of the coolant tank to space the tubes a predetermined distance from the sidewall and orient the pipes substantially parallel to the sidewall and to each other.

The coolant ports of the endwalls are positioned to directly confront the U-shaped couplers, resulting in hot coolant entering the coolant tank and immediately striking and breaking against a coupler and flowing about the coupler before moving along, through, and out of the tank by the remaining coolant port after flowing about the second coupler. The positioning of the couplers in confronting relationship with the coolant ports generates turbulent coolant flow as the coolant enters and leaves the tank, thereby slowing the coolant flow and increasing its motion around the couplers to thereby promote additional heat transfer from coolant to the fuel heating conduit.

These and other advantages of the invention will be apparent from the appended drawings and the following detailed description.

BRIEF DESCRIPTION OF THE DRAWINGS

FIG. 1 is a schematic, partly cut away perspective drawing showing an embodiment of the heat exchanger invention connected in fluid flow relationship with the fuel and cooling systems of an internal combustion engine.

FIG. 2 is a cross sectional view of the embodiment of FIG. 1 taken from the direction of arrows 2—2.

FIG. 3 is a cross sectional view of the embodiment of FIG. 1 taken from the direction of arrows 3—3.

FIG. 4 is a cross sectional view of the embodiment of FIG. 3 taken from the direction of arrows 4—4.

FIG. 5 is a cross sectional view of the embodiment of FIG. 2 taken in the direction of arrows 5—5.

DESCRIPTION OF THE PREFERRED EMBODIMENT

Referring now to FIG. 1, a heat exchanger 10 embodying the invention has a sturdy, metal, fluid-tight coolant tank 12 comprised of generally cylindrical sidewall 14 and first and second endwalls 16 and 18, respectively, each endwall being rigidly fixed to the sidewall 14 in sealed relationship therewith by welding or other means known to the art. Although a metal tank is preferred, it should be understood that tanks formed of other rigid, long lasting, and fluid-tight materials may be substituted and are within the purview of the invention.

The endwall 16 has a coolant port 20 defined by nipple 21 and circular orifice 22 through the endwall 16, the nipple 21 being fixed in the orifice 22 and in sealed relationship therewith by welding, threading or other means known to the art. The endwall 16 is also provided with a fuel port 24 which is a generally circular orifice through the endwall 16 and is spaced a predetermined distance from the sidewall 14 of the coolant tank.

The remaining endwall 18 is provided with its own coolant port 26, defined by nipple 27 and circular orifice 28, the nipple 27 being fixed within the orifice 28 in sealed relationship therewith in any manner known to the art. A fuel port 30 passes through the endwall 18 and is spaced substantially the same distance from the sidewall 14 as fuel port 24 of endwall 16.

The coolant tank 12 has a venting valve 32 with an operating handle 33, the valve 32 being positioned at the top of the tank 12 to permit unwanted air bubbles and the like to be vented therefrom to facilitate complete filling of tank 12, as will be described hereafter.

The coolant port 26 is shown connected to a source of heated coolant 31 such as the cooling system of a truck, and may be connected upstream or downstream of the truck's water pump 34, the heat exchanger 10 functioning equally well whether the hot coolant 31 enters coolant port 20 and leaves by coolant port 26 or vice versa. The remaining coolant port 20 is also connected to the cooling system of the truck so that coolant leaving the tank 12 may be recycled through the radiator and the engine of the vehicle for reheating. It is preferred that the heat exchanger 10 be connected to receive heated coolant directly from the engine block 35 prior to the coolant being passed through the radiator of the vehicle to thereby provide coolant of a higher temperature to the tank 12. While the tank 12 has been shown and described herein as being connected within the cooling system of a motor vehicle, it should be understood that any source of flowing hot liquid can be used with the tank 12 and its operation is not limited to use with a vehicle's cooling system. While the hot coolant 31 may be delivered to the coolant tank 12 through either coolant port 20 or 26, for purposes of description it shall be presumed that the hot coolant enters the tank 12 through coolant port 26 and leaves by the coolant port 20, as indicated by the flow arrows of the drawing.

A fuel heating conduit 40 includes first, second and third generally elongated, rigid, straight tubes 42, 44 and 46, respectively, and 90° couplers 48, 50, 52 and 54, the tubes and couplers being connected in fluid flow relationship to define the triple-pass fuel heating conduit 40 extending between the fuel ports 24 and 30.

The first tube 42, which has a threaded end 56 extending outwardly through port 24 of the endwall 16, is fixed to the endwall 16 where it passes through the fuel port 24 by welding or other known means to establish a fluid-tight seal between the tube 42 and the endwall. The remaining end 57 of tube 42 is matably received in the female member 58 of the 90° coupler 48 and is sealed relative to the coupler 48 so that no fuel leakage occurs between the tube 42 and coupler 48. The female member 58 has an outwardly extending annular lip or flange 60 which is generally concentric with the first tube 42 and extends to and bears against the sidewall 14 of the coolant tank, the combined thickness of the wall of female member 58 and lip 60 of the coupler 48 being substantially equal to the distance between the fuel port 24 and the sidewall 14 of the tank to permit the first tube 42 to be generally parallel to the sidewall 14 of the coolant tank 12, as will be discussed further hereafter.

The 90° coupler or elbow 48 has a second female member 62, the member 62 also having an outwardly extending annular lip or flange 63 identical to the lip 60 already described. The overall length of the tank 12, the length of the first tube 42 and the size of the coupler 48 are selected such that when the tube 42 is fixed in the fuel port 24, the lip 63 bears firmly against the adjacent endwall 18 and defines a spacer for keeping the body of the coupler 48 a predetermined distance from the endwall 18 to permit fluid flow between the coupler 48 and the endwall 18.

A second 90° coupler or elbow 50 has a male member 64 which is matably received in the female member 62 of coupler 48, forming a fluid-tight seal therewith. The coupler 50 has its remaining end provided with a female member 66, which has an outwardly extending annular lip or flange 67 identical to the lip 60 described in conjunction with coupler 48. The end 68 of second tube 44 is received in female member 66 in sealed relationship therewith, and the lip 67 is generally concentric with the tube 44 and extends toward and bears against the sidewall 14 of the tank 12 to space the tube 44 a predetermined distance from the sidewall 14 which is substantially equal to the spacing between the sidewall 14 and the tube 42.

Accordingly, the 90° couplers 48 and 50 collectively comprise a generally U-shaped coupler 188 which bears against the sidewall 14 with lips 60 and 67, and also bears against the endwall 18 with the spacer 63 to assure that there is no vibration or movement of the U-shaped coupler 188 or the tubes connected thereto relative to the tank 12.

The remaining end 70 of tube 44 is matably received in sealed relationship with the female member 72 of coupler 52. The member 72 is also provided with an outwardly extending annular lip 73, which is generally concentric with the tube 44 and bears against the sidewall 14, spacing the tube 44 a predetermined distance from the sidewall substantially equal to the spacing of the end 68 of tube 44 to keep the tube 44 generally parallel to the sidewall 14.

The coupler 52 has its remaining end provided with a male member 74, which is received by the female member 76 of coupler 54 in sealed relationship therewith. The female member 76 has an outwardly extending annular lip 78 which defines a spacer for bearing against the endwall 16 and keeping the coupler 54 a predetermined distance from the endwall 16 to permit flow of coolant between the coupler 54 and the endwall.

The remaining end of the coupler 54 has a female member 80 in which an end 81 of tube 46 is received in sealed relationship with the member 80. Member 80 is also provided with an outwardly extending annular lip 82, concentric with the tube 46 to bear against the sidewall 14 and space the end 81 of the tube 46 a predetermined distance from the sidewall substantially equal to the spacing of end 83 from the sidewall.

The 90° couplers 52 and 54 collectively comprise a U-shaped coupler 186 connecting the tubes 44 and 46 and having a spacer in the form of lip 78 which bears against the endwall 16 to keep the body of the U-shaped coupler 186 spaced from the endwall to permit circulation of coolant therebetween.

The third tube 46 extends from the coupler 54 to and through fuel port 30 and endwall 18 and is rigidly fixed to the fuel port 30 and sealed relative thereto to prevent escape of fluid from the coolant tank 12. The fuel port 30 is spaced a predetermined distance from the sidewall 14 substantially equal to the spacing of the end 81 of the tube 46 from the sidewall to permit the tube 46 to be generally parallel to the sidewall and parallel to the tubes 42 and 44. The outwardly extending end 83 of the tube 46 is threaded to facilitate attachment to the fuel line 93 which extends to fuel filter 94 of the vehicle. The end 56 of tube 42 is connected to the fuel tank. If desired the end 56 may instead be connected to the filter 94 and the end 83 connected to the fuel tank 90 without affecting the efficiency of the heat exchanger 10, which is thus reversible in the fuel line.

The coolant port 26 is positioned on the endwall 18 such that it directly confronts the U-shaped coupler 188 so that coolant entering the tank 12 through the port 26 breaks against the coupler 188 and flows about the coupler, as best shown by the flow arrows of the drawings. The central axis 97 of orifice 28 of port 26 is positioned between the axes 98 and 99 of tubes 42 and 44, respectively. The described positioning of the port 26 results in generation of substantial turbulence when the hot coolant strikes the coupler 188 and the swirling currents of coolant about the coupler 188 assure substantial heat transfer between the coolant and the coupler 188. The remaining coolant port 20 is positioned to directly confront the U-shaped coupler 186 so that coolant leaving the tank 12 must flow about the coupler 186 before merging to leave the tank through the coolant port 20. The central axis 100 of orifice 22 of port 20 is positioned between the axes 99 and 101 of tubes 44 and 46, respectively. Accordingly, encouraging coolant flow completely about the coupler 186 encourages further heat transfer from the coolant to the coupler 186. Additionally, because of the positioning of the coolant ports 20 and 26, the mainstream of coolant flow between these ports and within the tank 12 concentrates the main stream of coolant flow about the tubes 42, 44 and 46 and provides a particularly hot core of coolant flow located generally centrally between the three tubes along the central longitudinal axis 15 of sidewall 14.

In operation, the heat exchanger 10 is connected with the power plant of a Diesel truck or the like such that the hot coolant from the engine block 35 flows to coolant port 26. The coolant port 20 is connected in the cooling system of the truck such that fluid leaving the tank 12 through port 20 flows back through the radiator and then to the engine block 34 for reheating. The circulating water pump 34 of the truck may be positioned either upstream or downstream of the tank 12 and continually circulates heated coolant through the coolant tank 12.

The fuel line 92 from the fuel tank 90 is connected to the end 56 of the fuel heating conduit 40, and the end 83 of tube 46 which exits the tank 12 through fuel port 30 is connected to the fuel line 93 which leads to fuel filter 94 and fuel pump 95, so that all fuel from the fuel tank 90 must pass through the heat exchanger 10 before reaching the fuel filter 94.

After the heat exchanger 10 has been installed on the engine as described, the coolant 31 is allowed to flow into the tank 12 by entering the tank through coolant port 26. The venting valve 32 is opened by twisting the handle 33, thereby permitting the tank 12 to fill. The valve is kept in an open condition until all air within the tank 12 has been forced out of the tank by the rising coolant level. At this time the valve 32 is closed and the interior of the tank 12 is fully occupied by liquid coolant 31.

As the truck engine 35 is operated, hot coolant is pumped into the tank 12 through coolant port 26, which directly confronts the U-shaped coupler 188. Hot coolant strikes the coupler 188, which breaks the oncoming coolant flow, causing the coolant to flow about the coupler 188, generating substantial turbulence thereabout which assures spreading of the coolant in all directions from the striking point on the coupler 188 to increase rapid distribution of coolant throughout tank 12 and promote efficient heat transfer between coolant and fuel heating conduit 40. The coolant flows from the area of endwall 18 along the tank 12 toward endwall 16. As the flow approaches the endwall 16, the flow converges toward the coolant port 20, passing about the U-shaped coupler 186 before leaving the tank through the port 20. The positioning of the coolant ports 20 and 26 at the shown locations causes the principal flow stream of coolant to be concentrated in the core area defined by the area generally within the elongated tubes 42, 44 and 46.

As the heated coolant flows through the coolant tank 12, cold, high-viscosity fuel from fuel tank 90 enters tube 42 at end 56, flowing along tube 42 and entering and flowing through couplers 48 and 50 to elongated tube 44. The fuel continues its flow from tube 44 through couplers 52 and 54 to tube 46 from which the fuel leaves the coolant tank 12 through end 83 of tube 46 and is directed to the fuel filter 94. As fuel flows through the fuel heating conduit 40, the initially viscous fuel becomes successively warmer and less viscous, until it leaves the coolant tank 12 at a temperature many degrees higher than at its entry and in a substantially more liquid condition, eliminating the likelihood of fuel filter clogging. The warmer, thinner fuel burns readily in the engine and produces better mileage and combustion.

Because the tubes 42, 44 and 46 are rigidly retained at the fuel ports and by the U-shaped couplers 188 and 186, which bear firmly against the sidewalls and the endwalls of the coolant tank, substantially all vibration of the conduit 40 is eliminated and no rubbing between the conduit and the tank 12 occurs. Because the endwalls 16 and 18 closely confine the couplers 186 and 188, the tubes 42, 44 or 46 do not become loosened from the couplers, and accordingly leaks between couplers and tubes are avoided. Accordingly, the invention provides a long lasting, sturdy, reliable and inexpensive heat exchanger which is highly resistant to vibration and breakdown, while effectively heating viscous fuel to a temperature where it can be efficiently burned and where no risk of clogged fuel filters occurs.

While the preferred embodiment of the present invention has been described, it should be understood that various changes, adaptations and modifications may be made therein without departing from the spirit of the invention and the scope of the appended claims.

What is claimed is:

1. A vibration resistant heat exchanger for internal combustion engines to preheat fuel flowing between a fuel tank and the engine and usable with a supply of flowing, heated coolant comprising:

a fluid-tight coolant tank including an elongated cylindrical sidewall and first and second endwalls, an endwall being positioned at each end of said cylindrical sidewall and fixed to said sidewall in sealed relationship therewith;

each of said endwalls having a fuel port and a coolant port passing therethrough, said coolant ports connectable with the supply of flowing heated coolant, permitting the heated coolant to flow through said coolant tank;

a fuel heating conduit within said coolant tank, extending between said fuel ports and connectable in fluid flow relationship with the fuel tank and the engine, said heating conduit including first, second and third fuel tubes positioned within said coolant tank and spaced from said sidewall;

said first tube having an end communicating with one of said fuel ports in sealed relationship therewith and said third tube having an end communicating with the remaining said fuel port in sealed relationship with the remaining said fuel port;

said heating conduit further including a pair of generally U-shaped couplers, a coupler being positioned adjacent each endwall, one of said couplers connecting the remaining end of said first tube in fluid flow relationship with an end of said second tube, and the remaining coupler connecting the remaining end of said second tube in fluid flow relationship with the remaining end of said third tube to permit continuous flow of fuel through said first, second and third tubes; and each said coupler bearing against said sidewall and against said adjacent endwall and cooperating with one another to wedge said heating conduit within said coolant tank to prevent movement of said heating conduit relative to said coolant tank, thereby stopping vibration and loosening of said fuel heating conduit within said coolant tank.

2. The vibration resistant heat exchanger of claim 1 wherein each said coupler has a spacer fixed thereto and extending outwardly to bear against the adjacent endwall to space each said coupler from its adjacent endwall, thereby permitting flow of the heated coolant between the coupler and the adjacent endwall to improve heat transfer from the coolant to said couplers.

3. The vibration resistant heat exchanger of claim 2 wherein each said coupler confronts a said coolant port to cause coolant entering and leaving said coolant tank by said coolant ports to flow about said couplers in entering and leaving said coolant ports, said couplers breaking the direct flow of coolant into and out of said coolant ports and creating turbulence about said couplers, resulting in improved heat transfer between the coolant and said heating conduit.

4. The vibration resistant heat exchanger of claim 1 wherein each said U-shaped coupler connecting said tubes is a pair of 90° couplers connected in fluid flow relationship with each other and with said tubes, each said 90° coupler having a lip concentric with the tube to which the 90° coupler is connected, said lip extending radially outward from the concentric tube and bearing against said sidewall to space said concentric tube from said sidewall.

5. The vibration resistant heat exchanger of claim 1 wherein said fuel ports and said U-shaped couplers cooperate to retain said first, second and third tubes a predetermined distance from said sidewall and substantially parallel to one another, thereby minimizing strain on said tubes and encouraging free flow of coolant between said tubes and said sidewall.

6. The vibration resistant heat exchanger of claim 1 wherein said first, second and third tubes have central longitudinal axes parallel to one another and said coolant ports have central longitudinal axes parallel to the axes of said tubes, the axis of said coolant port of said first endwall being positioned between the axes of said second and third tubes, and the axis of said coolant port of said second endwall being positioned between the longitudinal axes of said first and said second tubes, thereby assuring that said fuel heating conduit is directly in the flow stream of coolant entering and leaving said coolant tank and that hot coolant entering said coolant tank immediately strikes and flows about a said coupler of said heating conduit.

* * * * *